(12) United States Patent
Pfeiffer

(10) Patent No.: US 6,642,872 B2
(45) Date of Patent: Nov. 4, 2003

(54) OPTICAL CODE CONVERTER FOR OPTICAL CODE DIVISION MULTIPLEX SYSTEM

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/196,421

(22) Filed: Jul. 17, 2002

(65) Prior Publication Data

US 2003/0034907 A1 Feb. 20, 2003

(30) Foreign Application Priority Data

Aug. 20, 2001 (EP) .......................................... 01440274

(51) Int. Cl.⁷ .............................................. H03M 1/00
(52) U.S. Cl. ........................ 341/137; 359/136; 385/27
(58) Field of Search .......................... 341/137; 385/27; 359/189, 136

(56) References Cited

U.S. PATENT DOCUMENTS 6,055,345 A  *  4/2000  Ahn et al. ..................... 385/24
6,141,469 A  * 10/2000  Kashyap ...................... 385/27

FOREIGN PATENT DOCUMENTS

DE          197 25 714 C1     12/1998
DE          198 33 549 A1      1/2000

OTHER PUBLICATIONS

Kitayama K–I: "Code Division Multiplexing Lightware Networks Based Upon Optical Code Conversion" IEEE Journal on Selected Areas in Communications, IEEE Inc. New York, US, Bd. 16, Nr. 7, Sep. 1, 1998, pp. 1309–1319.

Zhang L et al.: "An ATM cross–connecting node using optical CDMA" Computer Communications, Elsevier Science Publishers BV, Amsterdam, NL, Bd. 22, Nr. 9, Jun. 15, 1999, pp. 849–857.

* cited by examiner

*Primary Examiner*—Peguy Jeanpierre
(74) *Attorney, Agent, or Firm*—Sughrue Mion, PLLC

(57) ABSTRACT

In OCDM systems, optical signals have hitherto been transmitted to the receiving end in the optical transmission channel assigned at the transmitting end. This type of transmission is rigid and makes possible only simple network topologies, such as, for example, point-to-point. The object of the invention is to make possible a flexible allocation of channels. The code converter according to the invention serves to convert an optical signal from a first optical transmission channel to a second optical transmission channel, and includes a first optical filter for filtering the first optical transmission channel, an optical broadband source and a second optical filter for filtering the second optical transmission channel.

6 Claims, 1 Drawing Sheet

OPTICAL CODE CONVERTER FOR OPTICAL CODE DIVISION MULTIPLEX SYSTEM

TECHNICAL FIELD

The invention relates to an optical code converter for OCDM.

The invention is based on a priority application EP 01 440 274.7 which is hereby incorporated by reference.

BACKGROUND OF THE INVENTION

OCDM systems comprise optical filters that are used, inter alia, for encoding and decoding optical signals. OCDM is also described as OCDMA; OCDM=optical code division multiplex, OCDMA=optical code division multiple access. OCDM is based on spectral encoding of broadband optical sources. The light of an LED modulated with data to be transmitted is passed, for example, through an optical filter and encoded in this way; LED=light-emitting diode. A plurality of said LEDs and optical filter combinations is connected at the transmitter end, for example, via an optical coupler to an EDFA that is connected to an optical glass-fibre line; EDFA=erbium-doped fibre amplifier. In this way, variously encoded optical signals are generated that are transmitted together in amplified form via the glass fibre. A transmission to a plurality of receiving ends can take place via optical splitters. Each receiving end comprises, for example, a differential receiver having an appropriate optical filter for decoding the optical signals intended for the receiving end.

An optical filter is designed, for example, as Mach-Zehnder filter. In the Mach-Zehnder filter, the received OCDM signal is forwarded via two paths that have complementary transmission functions. The Mach-Zehnder filter can be used both for encoding and for decoding OCDM signals.

At the transmission end, an optical filter is used, for example, for each optical transmission channel. The optical filters must be tuned well with respect to one another in order, for example, to reduce crosstalk. At the receiving end, an optical filter is used, for example, that is tuned to the optical transmission channel provided for the receiving end. Alternatively, the same number of optical filters is, for example, used at the receiving end as at the transmitting end. The optical filters at the receiving end are tuned to the optical filters at the transmitting end.

In OCDM systems, optical signals have hitherto been transmitted to the receiving end in the optical transmission channel assigned at the transmitting end. This type of transmission is rigid and makes possible only simple network topologies, such as, for example, point-to-point.

SUMMARY OF THE INVENTION

An object of the invention is to make possible a flexible allocation of channels.

This object is achieved by an optical OCDM code converter for converting an optical signal from a first optical transmission channel to a second optical transmission channel, comprising a series connection of a first (decoding) optical filter for filtering the first optical transmission channel, an optical coupler and an optical broadband source and a second (encoding) optical filter for filtering the second optical transmission channel that is connected to the optical coupler, wherein the second optical transmission channel differs from the first optical transmission channel.

The code converter according to the invention is notable for a simple and efficient type of code conversion in an OCDM system, which code conversion may be used, for example, for optical routing. This makes possible the construction of OCDM systems having flexible topologies. Optical routers are sited at network nodes and perform optical routing, for example for the purpose of setting up optical Internet connections. The OCDM system may be used, for example, as an optical transmission network and/or an optical switching network. Via the OCDM system, for example, SONET, SDH, ATM, VoIP, IP, DSL, voice, data or video signals can be transmitted; SONET=synchronous optical network, SDH=synchronous digital hierarchy, ATM=asynchronous transfer mode, VoIP=voiceover Internet protocol, IP=Internet protocol, DSL=digital subscriber line.

In an advantageous refinement of the invention, both a code conversion and a wavelength conversion are possible. This extends the degree of freedom in allocating signals to transmission channels in various wavelength bands so that still more complex network structures are made possible.

Advantageous refinements are to be found in the dependent claims and the description below.

BRIEF DESCRIPTION OF THE DRAWINGS

The invention is explained below on the basis of two exemplary embodiments and by reference to two figures. In the figures.

BEST MODE FOR CARRYING OUT THE INVENTION

Figure 1:
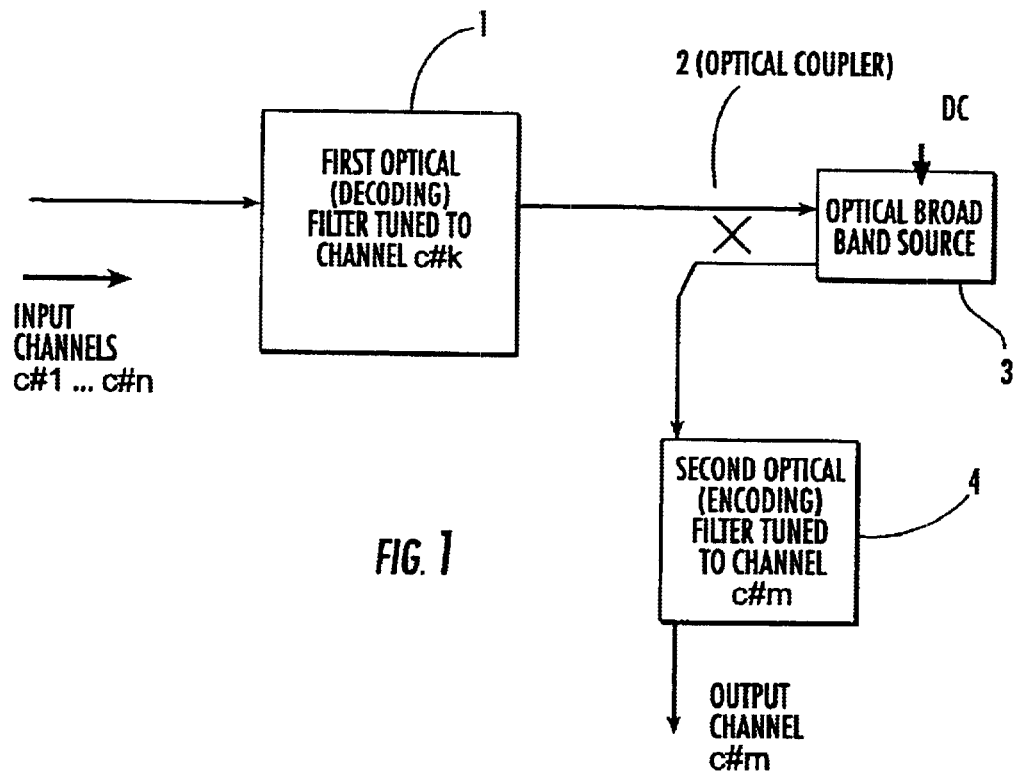
FIG. 1 shows a diagrammatic representation of an optical channel converter according to the invention.

The first exemplary embodiment is now explained by reference to FIG. 1. FIG. 1 shows an optical OCDM code converter according to the invention for converting an optical signal from a first optical transmission channel to a second optical transmission channel, comprising: a series connection of a first optical filter 1 for filtering the first optical transmission channel, an optical coupler 2 and an optical broadband source 3; and a second optical filter, for filtering the second optical transmission channel, that is connected to the optical coupler, wherein the second optical transmission channel differs from the first optical transmission channel. An optical circulator may also be used instead of the optical coupler 2. The optical OCDM code converter serves to convert code shift keying signals. The latter are described, for example, in the not yet published German Patent Application P 100 350 74.7.

The optical filter 1 has an input and an output. A signal mixture comprising optical OCDM signals is fed to the input. The OCDM signals are transmitted in superimposed optical transmission channels. For example, n transmission channels c#1 to c#n are superimposed, where n is a natural number between, for example, 2 and 100. The optical filter 1 is now adjusted so that it is suitable for detecting an OCDM signal in a specific transmission channel, for example in the transmission channel c#k, where k is equal to a natural number between 2 and n. OCDM signals in the transmission channel c#k are preferentially forwarded by the optical filter 1, i.e. OCDM signals in the transmission channel c#k are less attenuated than OCDM signals in other transmission channels and/or forwarded at higher intensity.

Consequently, there are available at the output of the optical filter 1 OCDM signals in the transmission channel c#k that are transmitted via the optical coupler 2, which is designed, for example, as a 3 dB coupler, to the optical broadband source 3.

The optical broadband source 3 converts the received OCDM signals in the transmission channel c#k into an unencoded signal spectrum. The unencoded, broadband signal spectrum generated by the optical broadband source is at the some time modulated with the output signal of the first optical filter 1. An example of the modulation, which may be described as intensity modulation or amplitude modulation, is found in the not yet published German Patent Application P 100 137 18.0. Said unencoded signal spectrum is fed via the optical coupler 2 to the second optical filter 4.

In the second optical filter 4, the unencoded optical signal spectrum is encoded into the desired transmission channel. The unencoded signal spectrum is encoded and, for example, transmitted in the transmission channel c#m, where m is equal to a natural number between 2 and n, with the exception of k. Optionally, m may also be equal to k. Thus, a code conversion has taken place between the input of the first optical filter 1 and the output of the second optical filter 4. OCDM signals that are received in the transmission channel c#k are now transmitted in the transmission channel c#m.

The second exemplary embodiment is now explained with reference to FIG. 2.

Figure 2:
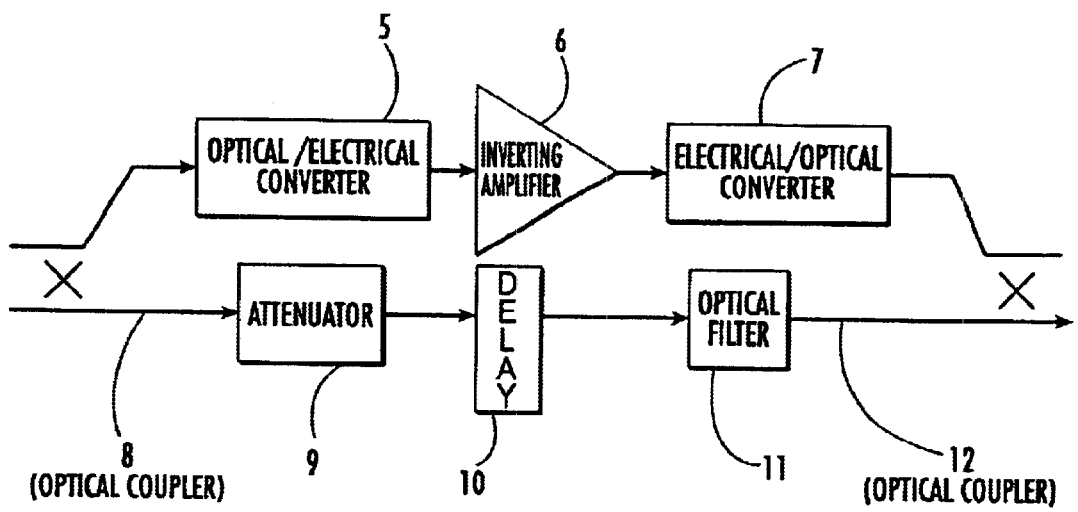
FIG. 2 shows a diagrammatically represented structure of an optical signal processor.

FIG. 2 shows an optical signal processor that has two parallel-connected paths, a series connection comprising an attenuator 9 and a third optical filter 11 for filtering the first optical transmission channel is disposed in the one path and a series connection comprising an optical/electrical converter 5, an electrical inverting amplifier 6 and an electrical/optical converter 7 is disposed in the other path. An optical OCDM code converter according to the invention that is similar to the optical OCDM code converter in FIG. 1, with the exception that the optical signal processor is provided instead of the first optical filter 1, is constructed by means of the optical signal processor. The third optical filter 11 takes over the task of the first optical filter 1.

The other path serves to generate compensation signals that are used to reduce the so-called crosstalk in the filtered transmission channel. The implementation of the generation of the compensation signals by means of the series connection comprising the optical/electrical converter 5, the electrical inverting amplifier 6 and the electrical/optical converter 7 is by way of example and not restricted to the use of the specified components.

The optical OCDM code converter according to FIG. 2 employs on/off keying signals.

The gain of the inverting amplifier and the attenuation of the attenuator 9 are matched to one another taking account of the attenuation properties and amplification properties of the optical/electrical converter 5 and of the electrical/optical converter 7 in such a way that the superimposed signals of the two paths result in a constant signal shape with respect to the transmission channels not to be filtered.

The optical code converter is furthermore characterized in that there is connected between attenuator 9 and third optical filter 11 a delay element 10 whose delay is dimensioned in such a way that the transit time through the two paths is matched. In the ideal case, the transit time is identical, with the result that a synchronized superimposition of the filtered signals and the compensation signals takes place.

The optical/electrical converter 5 is, for example, designed as a photodiode, the electrical/optical converter 7, for example, as a laser diode and the third optical filter 11, for example, as an adjustable Fabry-Pérot filter.

The following applies to both exemplary embodiments:

An optical inverter is advantageously connected between optical coupler 2 and second optical filter 4 or downstream of the second optical filter 4. The optical inverter is designed, for example, as an optical broadband source, as an optical semiconductor amplifier or as a light-emitting diode. The optical inverter serves to compensate for the signal inversion generated in the optical broadband source 3. In this way, the output signals at the second optical filter 4 are given the same polarity as the input signals at the first optical filter 1.

A wavelength filter is advantageously connected between the optical coupler 2 and the second optical filter 4 or downstream of the second optical filter 4 in order to filter the output signal of the optical broadband source 3 into a desired wavelength band. The second optical filter 4 then serves to filter the second optical transmission channel, wherein the second optical transmission channel differs from the first optical transmission channel or is similar to the first optical transmission channel. The wavelength band of the output signals of the optical code converter can be chosen by means of the wavelength filter. As a result, the optical code converter may be used both as a code converter and as a wavelength converter. Consequently a code conversion, a wavelength conversion or a code and wavelength conversion of received optical OCDM signals can be performed. The signals received at the input of the first optical filter 1 are transmitted, for example, in a wavelength band 1, for example 1520 to 1530 nm or 1330 to 1350 nm. The output signals of the second optical filter are to be transmitted in a wavelength band 2, for example 1540 to 1550 nm or 1300 to 1320 nm. The wavelength filter is used for the wavelength conversion. Consequently, the optical channel converter is suitable both for transmission channel conversion and for wavelength conversion, thereby creating a further functionality and flexibility.

The optical broadband source 3 is designed, for example, as optical broadband source, as optical semiconductor amplifier with an adjustable DC connection or as a high-power light-emitting diode. The DC connection serves to supply power to the semiconductor amplifier.

The first optical filter 1 is designed, for example, as Fabry-Pérot filter, as Mach-Zehnder filter or as AWG filter, the second optical filter 4 is designed, for example, as Fabry-Pérot filter, as Mach-Zehnder filter or as AWG filter and the third optical filter 11 is designed as Fabry-Pérot filter, as Mach-Zehnder filter or as AWG filter. All three filters 1, 4, 11 may be adjustable filters. Through the adjustability, the filters can be corrected, in particular, in the event of drifts in the optical filters at the transmitting end or to adjust different transmission channels to be filtered.

To construct an optical router for an OCDM system, at least two parallel-connected optical code converters according to the invention are used. The filters are adjusted by means of a control unit, for example a processor, in such a way that the respective appropriate transmission channels are converted at the appropriate switchover times. To detect the switchover times and the first and second transmission channels, the control unit detects, for example, a header that is transmitted, for example, in an OCDM signal. The optical router furthermore contains, for example, optical splitters and optical couplers for splitting received OCDM signals and for combining outgoing OCDM signals. Connections may be provided to a plurality of optical glass fibre lines for receiving a plurality of different OCDM signals and connections may be provided to a plurality of optical glass fibre lines for emitting different OCDM signals in converted transmission channels at one and the same wavelength or one and the same wavelength band or different wavelengths or different wavelength bonds. An optical router may also be constructed partly from optical switches and partly from optical code converters. The optical switches form a matrix for routing of OCDM signals without channel conversion and the optical code converters serve to route OCDM signals with channel conversion. The optical switches may, in addition, be linked by wavelength filters for the purpose of routing OCDM signals with wavelength (band) conversion.

An OCDM system according to the invention comprises at least two optical routers that are disposed at the network nodes. The OCDM system is designed, for example, as a meshed network, a star-type network, a bus or a tree network. At the network nodes, which are interconnected by means of optical glass fibre connections, one or more optical routers may be used to route optical OCDM signals with or without channel conversion and with or without wavelength (band) conversion.

The optical code converter according to the invention and the optical router are advantageously designed completely or partly as an integrated circuit.

What is claimed is:

1. An optical OCDM code converter for converting an optical signal from a first optical transmission channel to a second optical transmission channel, comprising:

a series connection of a first optical filter for filtering the first optical transmission channel, an optical coupler and an optical broadband sources;

and a second optical filter for filtering the second optical transmission channel that is connected to the optical coupler, wherein the second optical transmission channel differs from the first optical transmission channel.

2. The optical converter according to claim 1, wherein, instead of the first optical filter, an optical signal processor is provided that has two parallel-connected paths, wherein a series connections comprising an attenuator and a third optical filter for filtering the first optical transmission channel out of a plurality of channels received, is disposed in one of said paths, and wherein a series connection, comprising an optical/electrical converter, an electrical inverting amplifier and an electrical/optical converter, are disposed in the other of said paths.

3. The optical code converter according to claim 2, wherein there is connected between said attenuator and said third optical filter a delay element whose delay is dimensioned in such a way that the transit time through the two paths is matched.

4. Optical code converter according to claim 2, wherein the optical/electrical converter is designed as a photodiode, the electrical/optical converter as a laser diode and the third optical filter as an adjustable Fabry-Prot filter or Mach-Zehnder filter.

5. Optical code converter according to claim 1, wherein the optical broadband source is designed as an optical semiconductor amplifier or as light-emitting diode.

6. Optical code converter according to claim 1, wherein the first optical filter is designed as a Fabry-Prot filter, as a Mach-Zehnder filter or as an AWG filter and in that the second optical filter is designed as a Fabry-Prot filter, as a Mach-Zehnder filter or as an AWG filter.

* * * * *